United States Patent [19]

Sugiura

[11] Patent Number: 4,482,229
[45] Date of Patent: Nov. 13, 1984

[54] FILM AUTO LOADING MECHANISM FOR CAMERA

[75] Inventor: Yoji Sugiura, Kanagawa, Japan
[73] Assignee: Canon Kabushiki Kaisha
[21] Appl. No.: 420,312
[22] Filed: Sep. 20, 1982

[30] Foreign Application Priority Data

Oct. 7, 1981 [JP] Japan .......................... 56-149067[U]

[51] Int. Cl.³ .............................................. G03B 1/04
[52] U.S. Cl. .................................... 354/212; 354/288
[58] Field of Search .............. 354/212, 213, 288, 202; 242/197, 71.1

[56] References Cited

U.S. PATENT DOCUMENTS 3,387,546 6/1968 Winkler ............................... 354/212
4,274,726 6/1981 Yoneyama et al. ................. 354/212
4,310,233 1/1982 Okuyama et al. ................... 354/212

FOREIGN PATENT DOCUMENTS 35870 4/1969 German Democratic Rep. ..................................... 354/212

Primary Examiner—A. A. Mathews
Attorney, Agent, or Firm—Toren, McGeady and Stanger

[57] ABSTRACT

A winding device is provided with a first guide roller for bringing the tongue of the film into contact with a frictional member on the outer periphery of a takeup spool, and a second guide roller for conforming the film tongue to the takeup spool when the film is wound on the takeup spool by almost one turn, wherein the free end portion of a support plate for the second guide roller is extended concentrically to the pivot shaft of the support plate.

12 Claims, 3 Drawing Figures

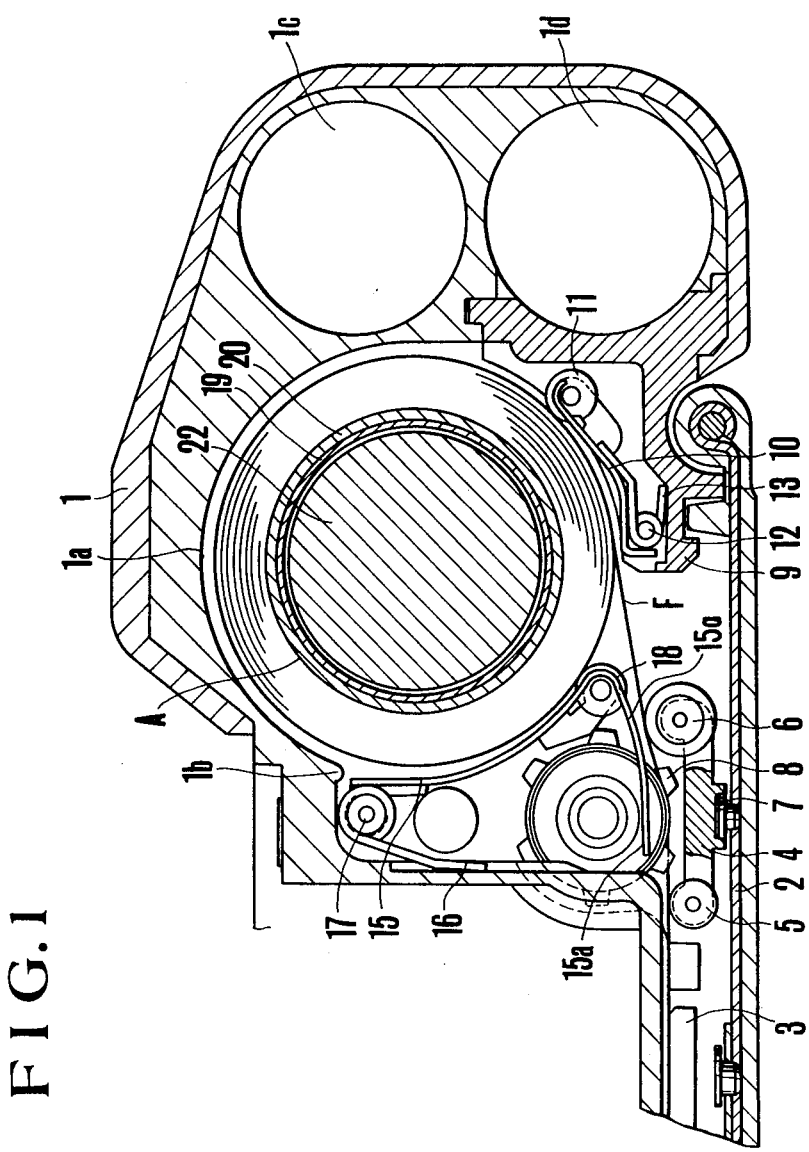

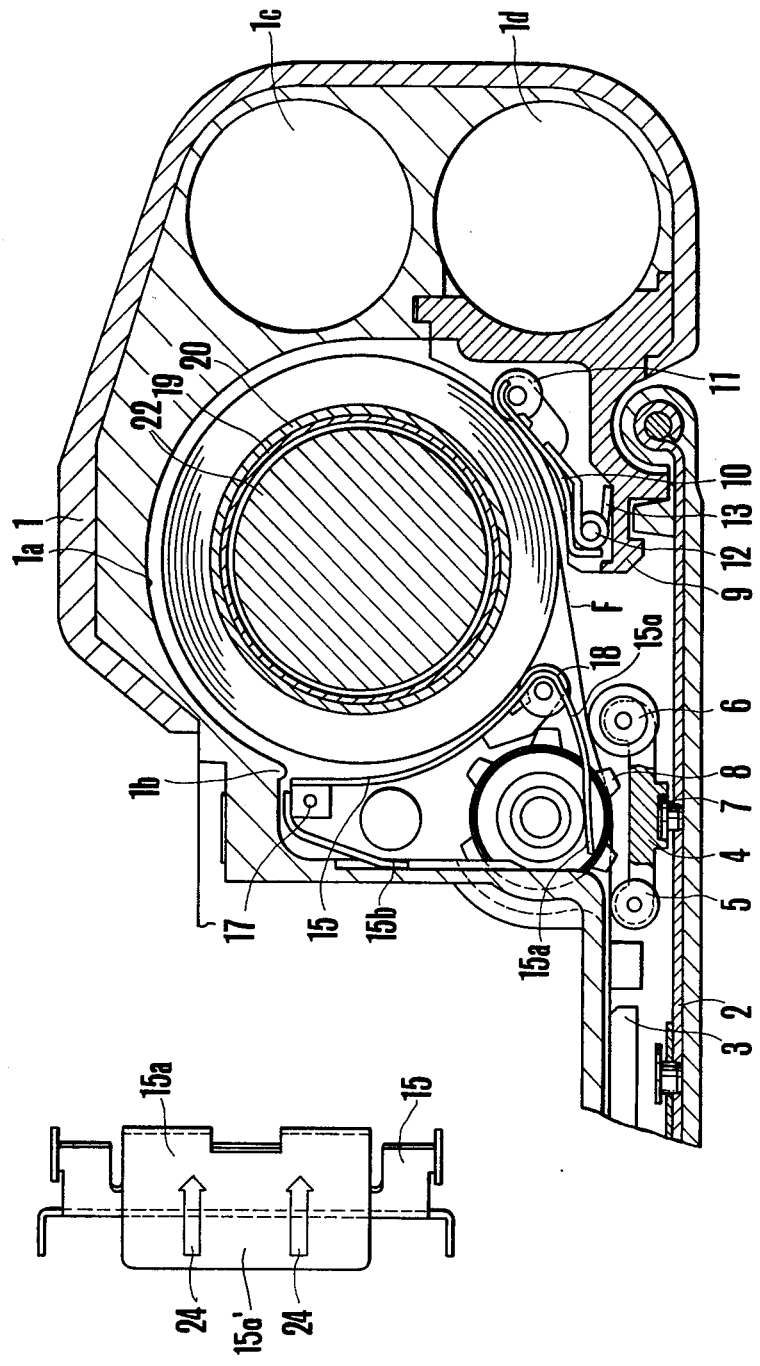

FILM AUTO LOADING MECHANISM FOR CAMERA

BACKGROUND OF THE INVENTION

1. Field of the Invention

This invention relates to winding device for cameras, and more particularly to a winding device for a camera having a film auto-loading mechanism for automatically connecting the film leader to the takeup spool.

2. Description of the Prior Art

In the past, a wide variety of film auto-loading mechanisms for automatically taking up a film leader have been known. For example, in one device the outer periphery of the takeup spool is provided with a frictional member of rubber or the like, and this frictional member cooperates with a first guide roller to bring the film leader into contact therewith. A second guide roller is also provided for conforming the film leader to the takeup spool when the film is wound by almost one turn so that the film leader is connected to the takeup spool by the frictional force. A mechanism of this type is disclosed, for example, in U.S. Pat. No. 4,274,726 (issued June 23, 1981). In the winding device for a camera having such a film auto-loading mechanism, however, when it is desired to load the film, as the film is advanced by one blank frame, the film leader is liable to enter a space between the sprocket and the takeup spool so as to oppose the direction in which the film is wound up. If so, the auto-loading does not work, thus producing a problem in that subsequent advancement of the film cannot be effectively carried out.

To solve such a problem, therefore, according to the prior art as disclosed in, for example, Japanese Laid Open Utility Model No. Sho 56-77819 (published June 24, 1981), there has been proposed a mechanism wherein a thin plate is provided for guiding the film from the terminal end of the rail in the camera body to the takeup spool in fixedly secured relation to the rail end. However, since the diameter of convoluted film on the takeup spool increases as the winding of the film progresses, it is required that the thin plate be extended from the rail end not so much as to allow the free end of the thin plate to contact with the film no matter how large the diameter of convoluted film may become. To fulfil this requirement, a certain gap must be formed between the free end of the thin plate and the takeup spool. This makes it impossible to assure that during loading of the film, the film leader will be perfectly guided to the takeup spool. Also, with the use of such a method, there arises the need for fixedly mounting the thin plate to the end of the rail by screw fasteners when the framework is die cast, or by an adhesive in the case of a molded framework, thereby creating additional drawbacks in that the assembling operation is very time-consuming and that the structure is made more complicated.

SUMMARY OF THE INVENTION

The present invention aims to eliminate the drawbacks of the conventional device, and its object is to provide a winding device for a camera capable of film auto-loading with a simplified structure while still permitting the film leader to be guided to the takeup spool with high reliability.

This and other objects of the present invention will become apparent from the following description of embodiments thereof taken in connection with the accompanying drawings.

BRIEF DESCRIPTION OF THE DRAWINGS

FIG. 1 is a top plan view of an embodiment of a winding device for a camera according to the present invention.

FIG. 2 is an elevational view of the guide plate of FIG. 1.

FIG. 3 is a top plan view illustrating another embodiment of the invention.

DETAILED DESCRIPTION OF THE PREFERRED EMBODIMENTS

The present invention will next be described in greater detail in connection with illustrated embodiments thereof.

FIG. 1 illustrates a fragmentary section of the camera of the invention in a position where a 36-frame roll of film is wound on a takeup spool A. In this drawing, 1 is a camera body having a spool chamber 1a which contains the spool A, a projected portion 1b for guiding the film leader, and battery chambers 1c and 1d which contain batteries. The body 1 also rotatably carries a back cover 2. A pressor plate 3 for pressing a film F against a pair of rails is supported on the back cover 2 through a leaf spring. Also fixedly mounted on the back cover 2 by screw fasteners 7 is a support plate 4 rotatably carrying guide rollers 5 and 6 for pressing the film F on a sprocket 8 so as to insure that the perforations of the film F engage the teeth of the sprocket 8. A roller holder 9 is fixedly mounted on the camera body 1 by screw fasteners or the like and pivotally supports a guide plate 10 through a shaft 12. Also this guide plate 10 is urged by a spring 13 in a counter-clockwise direction and its one side rotatably supports a guide roller 11 for bringing the film leader F into contact with the takeup spool A.

18 is a second guide roller for bringing the film F into conformation with the takeup spool A in a position where the film F is wound almost one turn on the takeup spool A, or near the sprocket 8. This guide roller 18 is rotatably supported on a guide plate 15 which forms one part of a guide means for the film leader. The guide plate 15 is pivotally mounted about a shaft 17 and is urged by a spring 16 in a counter-clockwise direction so that the guide roller 18 is urged toward the takeup spool A. Also, the guide means includes a second portion 15a connected with the guide plate 15, having a circular configuration centered at the rotary shaft 17, which is extended in a direction toward the sprocket 8, the portion 15a having an end portion 15a' and operating to guide the film leader F from the sprocket 8 to the takeup spool A. 19 is a metallic inner sleeve formed by molding as a unit with the takeup spool A. Fixedly mounted on the outer periphery of this inner sleeve 19 is a frictional member 20 made up of, for example, rubber. This inner sleeve 19 also serves as a means for shielding noise of an electric motor 22 from emerging out of the camera housing 1. Also the motor 22 which is drivingly connected to the takeup spool A and the sprocket 8 through intermediate gears (not shown), starts to move when the trailing curtain of the shutter has run down, and stops when the film F is advanced one frame.

To load the camera with the film F, the operator first opens the back cover 2 and inserts a cartridge into a cartridge chamber (not shown). After that, the leader of the film F is pulled out to a position slightly beyond the sprocket 8. After making sure the perforations of the film F engage with the teeth of the sprocket 8 perfectly, the operator closes the back cover 2. At this time, the guide rollers 5 and 6 press the film F to avoid detachment from the sprocket teeth 8. From this state it follows that when a release means (not shown) of the camera is actuated, the shutter operates and after the trailing curtain of the shutter has run down, the motor 22 starts to move, whereby the sprocket 8 and the takeup spool A are rotated in a counter-clockwise direction to advance the film F. It is to be noted that the sprocket 8 is so dimensioned that it rotates a prescribed angle (necessary to advance the film F through the length of one frame) and stops and that the takeup spool A is so arranged that it rotates slightly more than the amount of rotation of the sprocket 8.

The leader of the film F fed by the sprocket 8 moves along the end portion 15a of the guide plate 15 and then passes across the frictional member 20 of the takeup spool A and the guide roller 11. The film leader further advances therefrom while sliding on the inner periphery of the spool chamber 1a and with the help of the projected portion 1b without migrating into the gap between the guide plate 15 and the camera body 1 it passes along the guide plate 15 to the portion of the guide roller 18 contacting with the frictional member 20. The film leader after having passed through the contacting portion of the guide roller 18 with the frictional member 20 further advances until it strikes the portion of the film F tensioned between the sprocket 8 and the takeup spool A. From here, the film leader advances, while being guided by the tensioned film F, to enter inside of the film F between the guide roller 11 and the frictional member 20. Since, as has been stated above, the takeup spool A is allowed by a friction mechanism to rotate slightly faster than the sprocket 8, the slack of the film F at the start of a loading is absorbed before rotation for about four frames is repeated. Thus, the film F loaded into the camera is automatically connected to, and tightly convoluted on, the takeup spool A and the camera is made ready to take pictures.

Also, after that, as the winding of the film F on the takeup spool A goes on, the guide plate 15 is gradually turned in a clockwise direction. For this reason, it follows that the end portion 15a of the guide plate 15 also moves clockwise. But, since the end portion 15a is formed in concentric relation to the pivot shaft 17 of the guide plate 15, its movement does not result in a change of the inclination to the film F and no undesired influence is imparted to the film F while the film F is being wound up. It should be also pointed out that because of such shape, a space having a width almost equal to the thickness of the end portion 15a along the circle with its center at the pivot shaft 17 suffices when the end portion 15a is provided in the camera body without having to mechanically interfere with other parts of the camera. Thus, the performance of the full function of the guide plate 15 can be assured at all times during the winding of the film as it is never restrained from movement.

FIG. 2 in an elevational view illustrates in detail the end portion 15a of the guide plate 15. In this drawing, arrow marks 24 indicate the direction in which the film leader is to be advanced. These marks 24 are formed on the surface of the end portion 15a by embossing means in the pressing operation for example, or by silk-printing means without the use of an additional separate member.

Also, FIG. 3 is a partly elevational and partly sectional view of another embodiment of the present invention, where the spring 16 of FIG. 1 for urging the guide plate 15 is omitted, and instead a resilient portion 15b is formed in the guide plate 15. This is intended to solve the problem which arises during assembly of the guide plate 15 on the pivot shaft 17, due to the fact that it is very difficult to install the spring 16. In other words, by omitting the spring 16 and using the resilient portion formed as a unit with the guide plate 15 the advantage of simplifying the assemblying operation is achieved.

It should be pointed out in connection with this embodiment that the guide plate 10, spring 13 and guide roller 11 are assembled as a unit on the pivot shaft 12, and this unit is built into the roller holder 9. This constructional feature operates to avoid the necessity of using a complicated mold in forming the camera body 1 and to make easier the assembling operation of the guide plate 10, spring 13 and the guide roller 11. It is to be also noted that the roller holder 9 also plays a role as a light-shielding member for protecting the spool chamber 1a from light leakage from the outside.

As has been stated above, in the present invention there is constructed a guide roller supporter which lies near the sprocket with its free side portion in an extended form so that the film is guided to the takeup spool as it is being fed, thereby giving an advantage that when loading the film, the film leader will be reliably directed to the space between the sprocket and the takeup spool to avoid interference with winding up of the film. Therefore it is possible to assure high reliability of the automatic film loading operation. Also according to the present invention, the necessity of providing a member for guiding the film leader from the sprocket to the takeup spool at the end of the film guide rails can be obviated, whereby the complexity of the structure can be reduced and the assembly operation simplified.

Further, the present invention has another feature that the end portion of the support plate is concentrically extended to a circle with its center at the pivot shaft of the support plate, so that the space necessary to operate the end portion can be minimized, and the inclination of the end portion to the film surface can be always maintained constant. Therefore, according to the present invention, it is possible to perform film feeding always under a constant condition, as the end portion shifts without undesired influence on the film.

While specific embodiments of the invention have been shown and described in detail to illustrate the application of the inventive principles, it will be understood that the invention may be embodied otherwise without departing from such principles.

What I claim:

1. A film auto loading mechanism for automatically bringing a leader of film into winding engagement on a takeup spool, including:
   (A) a takeup spool;
   (B) a sprocket, said sprocket and said takeup spool being arranged to define a space therebetween; and
   (C) guide means for guiding the leader of film so as to be trained around said takeup spool, said guide means including:
   (a) means defining a center of swinging motion about which said guide means swings;
   (b) a working portion operating so that the film is in contact with said takeup spool; and (c) a guide area for guiding the leader of film, said guide area having a first portion which extends from said center of swinging motion to said working portion to allow for the film leader to approach said takeup spool, and a second portion which extends from said working portion in a direction to said sprocket in order that when loading the film, the leader of film is prevented from migrating into said space between said sprocket and said takeup spool.

2. A mechanism according to claim 1 wherein said working portion is arranged to be abuttingly engageable on said takeup spool and to swing about said center of swinging motion as the diameter of the convoluted film on said takeup spool changes.

3. A mechanism according to claim 2 wherein said working portion includes a rotatable guide roller.

4. A mechanism according to claim 1 further including bias means urging said guide means to rurn about said center of swinging motion in such a direction that said working portion approaches said takeup spool.

5. A mechanism according to claim 1 wherein the end of said second portion of said guide area is a free end.

6. A mechanism according to claim 5 wherein said second portion of said guide area has a form such as to enter a space between said sprocket and said film.

7. A mechanism according to claim 1 wherein said center of swinging motion lies in a space surrounded by a spool chamber, said takeup spool and said sprocket.

8. A mechanism according to claim 7 wherein the vicinity of the end of said second portion of said guide area lies on the opposite side of said swinging center to said sprocket.

9. A mechanism according to claim 1 wherein said second portion of said guide area is almost circular in shape with a center at said center of swinging motion.

10. A mechanism according to claim 4 wherein said bias means is formed as a unit with said guide means.

11. A film auto loading mechanism for a camera comprising:

a film takeup spool for winding film thereabout, said film having a leader adapted to initially engage said takeup spool for commencing the winding thereof on said spool;

a sprocket located to engage said film prior to said takeup spool for drivingly engaging said film, said sprocket and said takeup spool being arranged for rotation about generally parallel axes and defining a space therebetween which must be traversed by said film leader to effect winding thereof on said takeup spool;

guide means for guiding said film leader into said initial engagement around said takeup spool, said guide means comprising a first part having a first end and a second end arranged to extend along the periphery of said takeup spool, with said second end being located at least approximately adjacent said space between said sprocket and said takeup spool, said first part extending from said second end toward said first end in a direction against the direction of movement of said film leader around said takeup spool and being arranged to guide said film leader toward said takeup spool, pivot means at said first end mounting said guide means for swinging movement thereabout, and a second part extending from said second end of said first part toward said sprocket for guiding said film leader from said sprocket to said takeup spool and for preventing said film leader from entering said space therebetween as it moves from said sprocket to said takeup spool.

12. A mechanism according to claim 11 further comprising a roller mounted at said second end of said first part adapted to press said film against said takeup spool and spring means urging said first part to swing about said pivot means in a direction to urge said roller against said takeup spool.

* * * * *